United States Patent [19]

De Grave et al.

[11] Patent Number: 5,077,322

[45] Date of Patent: Dec. 31, 1991

[54] FOAMS BASED ON AN OLEFIN COPOLYMER

[75] Inventors: Isidoor De Grave, Wachenheim; Joachim Fischer, Dirmstein; Wolfram Koegel, Mannheim; Hermann Tatzel, Weinheim; Onno Graalmann, Dossenheim; Juergen Kerth, Carlsberg; Rainer A. Werner, Bad Duerkheim, all of Fed. Rep. of Germany

[73] Assignee: BASF Aktiengesellschaft, Ludwigshafen, Fed. Rep. of Germany

[21] Appl. No.: 684,277

[22] Filed: Apr. 12, 1991

[30] Foreign Application Priority Data

Apr. 14, 1990 [DE] Fed. Rep. of Germany ....... 4012239

[51] Int. Cl.$^5$ ................................................ C08J 9/22
[52] U.S. Cl. ...................................... 521/144; 521/56; 521/58; 521/60; 521/143; 521/144

[58] Field of Search ...................... 521/56, 58, 60, 143, 521/144

[56] References Cited

U.S. PATENT DOCUMENTS

| | | | |
|---|---|---|---|
| 4,448,901 | 5/1984 | Senda et al. | 521/60 |
| 4,525,486 | 6/1985 | Kobayashi et al. | 521/60 |
| 4,720,509 | 1/1988 | Nakamura | 521/60 |
| 4,746,706 | 5/1988 | Nakagawa | 521/60 |
| 4,761,431 | 8/1988 | Nakamura | 521/60 |
| 4,766,157 | 8/1988 | Yamada et al. | 521/60 |
| 4,777,000 | 10/1988 | Kuwabara et al. | 521/60 |

*Primary Examiner*—Morton Foelak
*Attorney, Agent, or Firm*—Oblon, Spivak, McClelland, Maier & Neustadt

[57] ABSTRACT

Novel foams having a density of from 0.01 to 0.1 g/cm$^3$, based on a copolymer comprising ethylene, propylene and a C$_4$- to C$_8$-α-olefin, and having a torsion modulus of from 100 to 800 N/mm$^2$ have high tensile, compressive and flexural strengths and at the same time high elongation at break.

1 Claim, No Drawings

FOAMS BASED ON AN OLEFIN COPOLYMER

The present invention relates to novel foams based on a copolymer of ethylene, propylene and a $C_4$- to $C_8$-α-olefin.

Foams based on polyolefins and olefin copolymers are of considerable industrial interest due to their temperature stability and good shock-absorbent properties. They are prepared in a conventional manner by impregnating the polymer with a volatile blowing agent under pressure and at elevated temperature and decompressing the mixture, using either extrusion or advantageously suspension impregnation. The latter process proceeds from polymer particles which are impregnated in aqueous suspension with the blowing agent and are subsequently expanded to give foam particles. Moldings of any desired shape can be produced by welding the foam particles.

However, the conventional foams based on olefin (co)polymers have a number of disadvantages. They either have high tensile, compressive and flexural strengths but unsatisfactory elongation at break, or high elongation at break with unsatisfactory tensile, compressive and flexural strengths.

It is an object of the present invention to provide foams which have both high tensile, flexural and compressive strengths and high elongation at break.

We have found that, surprisingly, this object is achieved by foams based on a certain copolymer of ethylene, propylene and a $C_4$- to $C_8$-α-olefin.

The invention accordingly provides a foam having a density of from 0.01 to 0.1 $g/cm^3$ and having from 2 to 1000 cells/$mm^2$, based on a copolymer comprising from 0.5 to 6% by weight of ethylene, from 88 to 99% by weight of propylene and from 0.5 to 6% by weight of a $C_4$- to $C_8$-α-olefin having a torsion modulus of from 100 to 800 $N/mm^2$.

The basic constituent of the foam according to the invention is a copolymer comprising from 0.5 to 6% by weight, preferably from 1 to 6% by weight, in particular from 1.5 to 6% by weight, of ethylene, from 88 to 99% by weight, preferably from 89 to 98% by weight, in particular from 90 to 97% by weight, of propylene, and from 0.5 to 6% by weight, preferably from 1 to 6% by weight, in particular from 1 to 5% by weight, of a $C_4$- to $C_8$-α-olefin, such as 1-butene, 1-pentene, 1-hexene, 1-heptene or 1-octene. The copolymer should have a torsion modulus of from 100 to 800 $N/mm^2$, preferably from 100 to 700 $N/mm^2$ in particular from 150 to 600 $N/mm^2$.

The copolymer is prepared in a conventional manner by copolymerizing the monomers using a transition-metal catalyst. The copolymers have a predominantly random structure, and are generally linear and uncrosslinked. The crystallite melting point, determined by the DSC method, is generally from 110° to 155° C., in particular from 115° to 150° C. The heat of fusion, determined by the DSC method, is generally from 30 to 110 J/g, preferably from 35 to 100 J/g. Preferred copolymers are those having a melt flow index MFI (230; 2.16) (in accordance with DIN 53 735) of from 0.5 to 15, in particular from 1 to 12 [g/10 min].

The foam may also contain conventional additives in effective amounts, such as dyes, pigments, nucleating agents, stabilizers, flameproofing agents, synergists, lubricants and antistatics.

The foam according to the invention has a density of from 0.01 to 0.1 $g/cm^3$, preferably from 0.1 to 0.08 $g/cm^3$, in particular from 0.02 to 0.08 $g/cm^3$. It has a predominantly closed-cell structure with from 2 to 1000, preferably from 5 to 800, in particular from 10 to 500, cells/$mm^2$.

The foam according to the invention is produced in a conventional manner by mixing the copolymer with a volatile blowing agent and, if used, the additives, and subsequently foaming the mixture. For example, the components are mixed in an extruder, and the mixture is subsequently extruded through a die, during which it expands. In this way, continuous films, extrudates and sheets can be produced.

Suitable blowing agents are low-boiling halogenated hydrocarbons and preferably aliphatic hydrocarbons having from 3 to 5 carbon atoms, such as propane, n-butane, isobutane, n-pentane, isopentane and/or neopentane. It is also possible to use mixtures of the said blowing agents.

The foam according to the invention is preferably produced in a conventional manner by suspension impregnation. To this end, the copolymer, expediently in the form of particles having a mean diameter of from 0.5 to 5 mm, preferably from 0.6 to 4 mm, is impregnated in aqueous suspension with from 0.1 to 0.4, preferably from 0.15 to 0.3, kg of a blowing agent per kg of the copolymer, at from about 5° C. to 20° C. below the crystallite melting point (DSC maximum) of the polymer, and subsequently decompressed with expansion.

The foam particles obtained generally have a mean diameter of from 1 to 20 mm and a bulk density of from about 7 to 55 g/l, preferably from 10 to 50 g/l.

In particular at low bulk densities, the blowing agent frequently diffuses out of the cells more rapidly than ambient air diffuses in. The particles may therefore in some cases shrink to up to 40% of their original volume. They readopt their original shape if they are treated for a sufficient time, generally from 5 to 500 minutes, at room temperature or elevated temperature, at most 20° C. below the crystallite melting point of the copolymer, with air or nitrogen at a superatmospheric pressure of from 0.5 to 10 bar. The foam particles may be welded by known processes by heating in a porous mold or a mold which does not close in a gas-tight manner, to give any desired moldings.

The foam according to the invention generally has a tensile strength of from 0.1 to 1.0 $N/mm^2$, a limiting flexural stress of from 0.1 to 1.0 $N/mm^2$, a compressive stress at 50% compression of from 0.05 to 0.6 $N/mm^2$, and an elongation at break of from 5 to 50%.

In the examples, parts are by weight.

The tensile strength and elongation at break were determined in accordance with DIN 53 571 (method II, specimen B), the compressive stress at 50% compression was determined in accordance with DIN 53 577, the limiting flexural stress was determined in accordance with DIN 53 423, and the torsion modulus was determined in accordance with DIN 53 445. The crystallite melting point was determined by heating a 10 mg sample to 200° C. at a rate of 20°/min, cooling the sample to room temperature at a rate of 20°/min and reheating to above the melting range at a rate of 20°/min. The crystallite melting point corresponds to the temperature peak in the DSC diagram in the second heating period.

EXAMPLE 1

100 parts of a copolymer comprising 4.1% by weight of ethylene, 94.5% by weight of propylene and 1.4% by weight of 1-butene (melt flow index 230; 2.16=5 g/10 min; DSC maximum 133° C., torsion modulus 360 N/mm$^2$, mean grain weight about 6 mg), 24 parts of n/i-butane (60:40), 227 parts of water, 6.8 parts of tricalcium phosphate and 0.14 part of sodium dodecylbenzenesulfonate as dispersion aid are heated to 118° C. over the course of 60 minutes with stirring in a pressure reactor and then, while the pressure in the reactor is kept constant at 30 bar by reinjecting nitrogen, discharged through a valve in the base and decompressed. Foam particles having a bulk density of 15 g/l and having from 10 to 250 cells/mm$^2$ are obtained.

After drying, the particles are treated with nitrogen at a superatmospheric pressure of 3 bar for 8 hours at 75° C. and then decompressed. On subsequent storage at room temperature, the pressure in the cells dissipates completely after about 1.5 hours. The bulk density is then 10 g/l.

The particles are then transferred pneumatically under pressure into a pre-heated mold chamber, a back pressure of 1 bar being maintained in the mold during filling. The mold is heated on both sides for 12 seconds with steam at 130° C. After decompression and cooling with water, the mold is opened and the molding removed. The molding has a density of 20 g/l, excellent welding, a tensile strength of 0.22 N/mm$^2$, a limiting flexural stress of 0.15 N/mm$^2$, a compressive stress (50% compression) of 0.14 N/mm$^2$ and an elongation at break of 30%.

EXAMPLES 2 TO 8

The procedure is as in Example 1, but uses a copolymer of the composition given in the Table, and various amounts of blowing agent and dispersion aid as well as various impregnation temperatures and times. The results are given in the Table.

TABLE

| Example | Comonomer content C2 [%] | C3 [%] | C4/C6/C8 [%] | DSC maximum [°C.] | MFI (230;2.16) [g/10 min] | Torsion modulus [N/mm$^2$] | n/i-butane (60:40) [parts] | tricalcium phosphate [parts] | Na dodecylbenzene-sulfonate [parts] | Impregnation temperature [°C.] |
|---|---|---|---|---|---|---|---|---|---|---|
| 1 | 4.1 | 94.5 | 1.4 C4 | 133 | 5 | 360 | 24 | 6.8 | 0.14 | 118 |
| 2 | 1.8 | 96.1 | 2.1 C4 | 141 | 1.5 | 440 | 24 | 6.8 | 0.14 | 126 |
| 3 | 4.1 | 91.0 | 4.9 C4 | 121 | 0.7 | 190 | 24 | 6.8 | 0.14 | 106 |
| 4 | 4.1 | 94.5 | 1.4 C4 | 133 | 5 | 360 | 20 | 3.4 | 0.02 | 117.5 |
| 5 | 4.1 | 91.0 | 4.9 C4 | 121 | 0.7 | 190 | 20 | 3.4 | 0.02 | 105.5 |
| 6 | 1.8 | 96.1 | 2.1 C6 | 140 | 2.5 | 460 | 24 | 6.8 | 0.14 | 125 |
| 7 | 5.6 | 91.9 | 2.5 C4 | 121 | 5.3 | 180 | 24 | 6.8 | 0.14 | 106 |
| 8 | 4.1 | 94.5 | 1.4 C4 | 133 | 5 | 360 | 20 | 3.4 | 0.02 | 116.3 |
| 9 (comp.) | 2.3 | 97.7 | | 151 | 8 | 720 | 24 | 6.8 | 0.14 | 135.8 |
| 10 (comp.) | 2.3 | 97.7 | | 151 | 8 | 720 | 20 | 3.4 | 0.02 | 135.8 |
| 11 (comp.) | 90.2 | | 9.8 C8 | 129 | 1.2 | 170 | 24 | 6.8 | 0.14 | 116.5 |
| 12 (comp.) | 90.2 | | 9.8 C8 | 129 | 1.2 | 170 | 20 | 3.4 | 0.02 | 115.8 |

| Example | Impregnation time [min] | Bulk density [g/l] | Bulk density after pressure gassing [g/l] | Molding density [g/l] | Tensile strength [N/mm$^2$] | Compressive stress (50% compression) [N/mm$^2$] | Limiting flexural stress [N/mm$^2$] | Elongation at break [%] | Number of cells cells/mm$^2$ |
|---|---|---|---|---|---|---|---|---|---|
| 1 | 60 | 15 | 10 | 20 | 0.22 | 0.14 | 0.15 | 30 | 10–250 |
| 2 | 65 | 17 | 11 | 22 | 0.26 | 0.15 | 0.23 | 25 | 10–250 |
| 3 | 53 | 16 | 10 | 20 | 0.15 | 0.12 | 0.11 | 45 | 10–250 |
| 4 | 60 | 33 | — | 60 | 0.73 | 0.40 | 0.68 | 20 | 15–350 |
| 5 | 53 | 32 | — | 55 | 0.52 | 0.31 | 0.45 | 30 | 15–350 |
| 6 | 64 | 16 | 10 | 20 | 0.25 | 0.15 | 0.23 | 30 | 10–250 |
| 7 | 53 | 17 | 12 | 22 | 0.15 | 0.12 | 0.12 | 45 | 10–250 |
| 8 | 58 | 48 | — | 75 | 0.85 | 0.52 | 0.9 | 18 | 50–600 |
| 9 (comp.) | 65 | 16 | 12 | 22 | 0.27 | 0.17 | 0.23 | 14 | 10–300 |
| 10 (comp.) | 65 | 33 | — | 55 | 0.75 | 0.50 | 0.83 | 11 | 15–500 |
| 11 (comp.) | 58 | 21 | — | 35 | 0.25 | 0.14 | 0.12 | 45 | 10–400 |
| 12 (comp.) | 58 | 32 | — | 50 | 0.38 | 0.22 | 0.3 | 35 | 20–600 |

We claim:

1. A foam having a density of from 0.01 to 0.1 g/cm$^3$ and having from 2 to 1000 cells/mm$^2$, based on a copolymer comprising from 0.5 to 6% by weight of ethylene, from 88 to 99% by weight of propylene and from 0.5 to 6% by weight of a C$_4$- to C$_8$-α-olefin having a torsion modulus of from 100 to 800 N/mm$^2$.

* * * * *